May 5, 1942.    R. R. FOWLER    2,281,687
RELAY
Filed Aug. 1, 1940
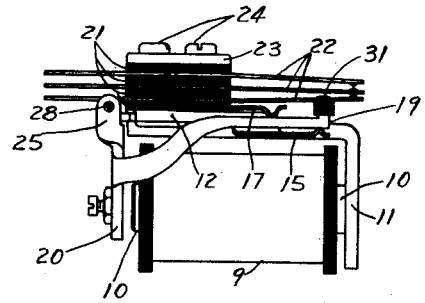
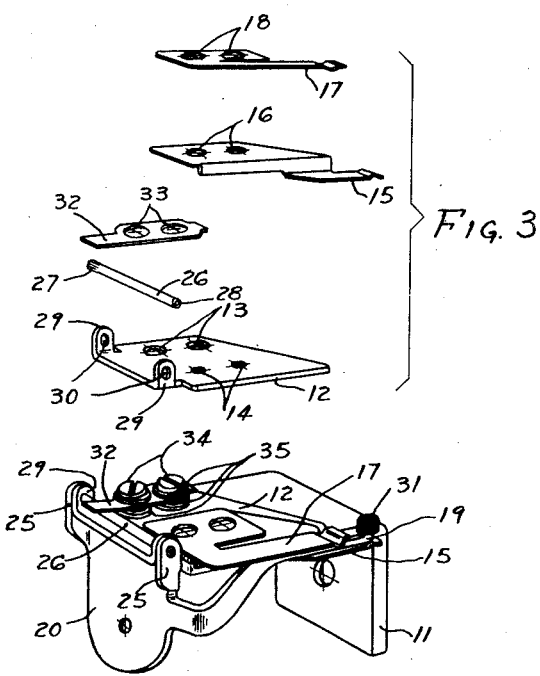
INVENTOR
RALPH R FOWLER
BY
ATTORNEY Patented May 5, 1942

2,281,687

UNITED STATES PATENT OFFICE 2,281,687

RELAY

Ralph R. Fowler, Oak Park, Ill., assignor to Associated Electric Laboratories, Inc., Chicago, Ill., a corporation of Delaware Application August 1, 1940, Serial No. 349,058

4 Claims. (Cl. 200—104)

This invention relates in general to electromagnetic relays and more particularly to relays having armatures of the rotatable pin-bearing type; and the object of the invention is the provision of a vibration resisting bearing for this type of relay.

Relays having armatures of the rotatable pin-bearing type are extensively used in telephone systems and prove very satisfactory. However, it has been found that relays of this type when subject to constant vibration, such as in an aeroplane or in a railroad train, are subjected to stresses not present in the normal use of these relays. Experience has shown that the vibration which is present causes excessive bearing wear which interferes with the correct performance of the relay. This type of wear changes the mechanical and electrical characteristics of the relay because a relatively small change in the position of the bearing pin will change the magnetic circuit and will also change the mechanical operation of the associated spring contacts. An analysis of this excessive wear resulting under these conditions shows that it results from at least two different types of motion.

The movable member, in this case the relay armature, exerts a turning movement proportional to its mass and the rate and direction of the vibration. This tends to produce an oscillation or movement of the armature about its axis, or bearing, at a rate corresponding to the vibration rate.

If the vibration excursions are in a plane which includes the bearing and the center of mass of the movable portion, a force is exerted which tends to make the pin chatter in the bearing at a rate proportional to the vibration rate.

The corrective measure applied to reduce or eliminate the first motion, or the wear due to the movement about the axis, consists in holding the rotary member against rotation with a force greater than the maximum force which will be exerted during vibration.

In regard to the second motion, or the wear due to the chatter of the pin in the bearing, it should be mentioned that manufacturing tolerances allowed for production and assembly of the parts of necessity allow a small clearance between the bearing pin and the bearing. This clearance between the pin and the bearing allows the bearing pin to be thrown against the wall of the bearing, when the relay is subject to vibrations, resulting in a peening or enlarging of the bearing and the deforming of the bearing pin. This action is accelerated as the bearing clearances increase. In order to correct this second motion it is, therefore, necessary to apply a force great enough to prevent chattering of the armature during vibrations.

According to the present invention, the above referred to motions of the armature produced by vibration of the relay have been eliminated by applying spring pressure between the pivot pin and its bearings in combination with applying spring pressure to the armature arm, such pressure being sufficient to prevent both the rotary motion and chatter motion during vibration, without materially affecting the operating and releasing characteristics of the relay when the same is energized and deenergized.

Other objects and advantages of the present invention will be apparent from the following description, reference being had to the accompanying drawing.

Fig. 1 shows an assembly view of the relay.

Fig. 2 shows a perspective view of only certain parts of the relay in their assembled locations.

Fig. 3 shows in perspective detail views of only certain of the parts of the relay shown in Fig. 2.

The relay comprises a magnet 9 having an iron core 10 secured to the L-shaped heel-piece 11 by means of a flat-head screw (not shown) extending through a hole in the heel-piece and into a threaded hole in the iron core 10.

A yoke 12 provided with elongated holes 13 and threaded holes 14 is mounted on the heel-piece 11 with the holes 13 alining with threaded holes (not shown) in the heel-piece and with the threaded holes 14 alining with elongated holes (not shown) in the heel-piece.

A back-stop 15 is provided with holes 16 and is placed on top of the yoke 12 with the holes 16 alining with the holes 14 as seen in Fig. 2. The back-stop 15 is bent at right angles as shown in Fig. 3 and has an arm with a raised portion engaging the armature arm 19. The arm of the back-stop may be bent to determine the air-gap between the armature 20 and the iron core 10 thereby determining the stroke of the armature.

An armature damper spring 17 is provided with holes 18 for alinement with the holes 16 and 14 of the back-stop 15 and yoke, respectively. The damper spring 17 is tensioned against the armature arm 19 to hold such arm against the back-stop 15 except when the magnet 9 is energized.

A contact spring assembly comprising insulating members 21, contact springs 22 and plate 23 is secured to the yoke 12 by means of screws 24 passing through holes in the plate 23, insulators 21, and contact springs 22, and holes 18 and 16 into threaded holes 14. The screws 24 thereby holding the damper spring 17 and back-stop 15 in assembled position.

The armature 20 is provided with up-turned ears 25 each having holes of the same diameter as the pivot pin 26. Pivot pin 26 at one end is knurled and at the other end is drilled a short distance as shown at 27 and 28 in Fig. 3.

The yoke 12 is provided with up-turned ears 29 each provided with a bearing hole 30. The diameter of the bearing holes 30 is substantially the same as the diameter of the pivot pin 26 or as near thereto as manufacturing tolerances allowed for production and assembly will permit so as to allow free rotation of the pin in its bearings without an appreciable amount of play.

The armature 20 is made of soft iron and is provided with an operating arm 19 and insulating bushing 31 for operating the spring contacts 22 to open and close electrical circuits.

In assembling the armature 20 and yoke 12 the ears 29 of the yoke are placed inside the ears 25 of armature 20 and the pivot pin 26 is driven through the holes in the ears 25 and the bearing holes 30 as shown in Fig. 2. The drilled end 28 of pin 26 is then flared to prevent endwise movement of the pin with respect to the ears 25. Due to knurled end 27 of pin 26 being driven into the hole in the left-hand ear 25 as seen in Fig. 2 the pivot pin is rigidly staked to the armature 20. When the spring contact pile-up, damper spring 17 and back-stop 15 are assembled to the yoke 12 as previously described the armature arm 19 is placed between the back-stop 15 and damper spring 17 as shown in the drawing.

In order to prevent play between the pivot pin 26 and the bearing holes 30 in the ears 29 when the entire relay is vibrated from an external source, a flat spring 32 is tensioned against the pin 26 and is mounted on the yoke 12 and heel-piece 11 by means of washers 35 and screws 34 which extend through the holes in the washers, the holes 33 in spring 32, the holes 13 in yoke 12 and into threaded holes (not shown) into the heel-piece 11. The elongated holes 13 are provided for changing the adjustment of the armature with respect to the heel-piece so that the distance between the end of the heel-piece and the portion of the armature directly to the left thereof may be varied. The washers 35 being built up to the desired height to cause spring 32 to apply the required tension to pin 26; this tension being such as to firmly hold the pin 26 against its bearing surfaces to prevent movement of the armature in case the relay is vibrated from an external source without appreciably retarding the rotary movement of the armature when the magnet 9 is being energized and deenergized to cause the desired armature operations.

Having described the construction and assembly of the relay, the utility and purpose of the invention will be set forth to enable the same to be more fully understood and appreciated.

It is well known that in mass production of a large number of parts which are to be assembled together, manufacturing tolerances within certain limits are resorted to to speed up production and to reduce the cost of manufacturing such parts. For example, since relay parts are manufactured in large numbers, manufacturing tolerances are allowed on both the pivot pin 26 and the bearing holes 30 of the relay shown in the drawing. It has been found that manufacturing tolerances limited to one-half thousandth of an inch oversize or undersize from the desired diameter of the pivot pin and that tolerances limited to one thousandth of an inch oversize or undersize from the desired diameter of the bearing hole are permissible for this type of relay for ordinary use, such as in telephone or like systems where the relay is not mounted on an object which is subject to vibrations. In view of the above mentioned tolerances allowed for production and assembly it can be seen that a bearing pin may be assembled in its bearing holes and that there may be considerable play between the pin and its bearing surfaces. This play may be as high as one and one-half thousandths of an inch if the smallest pin is assembled in the largest bearing hole permissible with the above mentioned tolerances.

Relays of this type having pivot pins and bearing holes with the above mentioned tolerance play between the pin and the bearing hole have been used extensively for a long period of time in telephone or like systems and have proven very satisfactory. However, it has been found from actual experience that this type of relay with its tolerance play at the armature bearing is unsatisfactory when such a relay is mounted on an object subject to vibration, such as in an aeroplane or a train, because the tolerance play permits vibration of the armature when the relay is not in use. These vibrations of the armature cause a gradual wearing of the pivot pin and a gradual peening or enlarging of the bearing holes thereby gradually increasing the play between the pin and its bearing surfaces.

When the relay is being vibrated, due to it being mounted on an object subject to vibrations from an external source, the armature tends to exert a turning force proportional to its mass and the rate and direction of the vibrations. This tends to produce an oscillation or movement of the armature about its axis, or bearing, at a rate corresponding to the vibration rate.

According to the invention, the armature arm damper spring 17, tensioned against armature arm 19, in ombination with the pivot pin damper spring 32, tensioned against the pivot pin 26 to frictionally hold pin 26 against its bearing surfaces 30, exert a combined force greater than the force capable of being developed by the mass of the armature when vibrated from an external source thereby preventing rotation of the armature when the relay is mounted on a vibrating object. The combined force exerted by damper springs 17 and 32 is sufficient to prevent rotation of the armature when said relay is being vibrated while not appreciably retarding armature rotation at the times magnet 9 is being energized and deenergized for the purpose of rotating said armature to cause spring contact actuations. In addition, the damper spring 17 also assists in restoring and holding the arm 19 in its normal unoperated position against the back-stop 15.

It is possible to tension the armature arm damper spring 17 against armature arm 19 with sufficient force to prevent rotary oscillations of the armature due to relay vibrations but this armature arm damper spring alone does not prevent chatter between the pivot pin and its bearing surfaces.

In case the vibration excursions of the relay are in a plane which includes the bearing and the center of mass of the armature, a force is exerted which tends to move the armature back and forth to make the pin chatter in its bearings at a rate proportional to the vibration rate because of the tolerance play between the pin and its bearing surfaces. The damper spring 17 has little or no effect in stopping this chatter motion. This chatter of the armature gradually wears the pivot pin and gradually enlarges the bearing hole thereby gradually increasing the play between the pin and its bearings. This wear may be in a direction to gradually change the mechanical and electrical characteristics of the relay thereby gradually changing the operating adjustments of the relay until ultimately the wear is sufficient to prevent such a relay from performing its designated functions when electrically operated. An enlargement of the bearing in one direction would reduce the air gap between the armature and associated iron core thereby shortening the stroke of the armature arm to a point where it no longer operated certain spring contacts in the spring contact pile-up.

In accordance with the present invention, the tensioning of pivot pin damper spring 32 against pivot pin 26 prevents movement of the armature and chattering of pin 26 in its bearings; the force exerted by spring 32 being greater than the force exerted by the mass of the armature when the relay is vibrated. As will be noted the spring 32 is tensioned against pin 26 in such a manner that in case the pin 26 and bearing surfaces wear some, due to the relatively infrequent energizations of magnet 9 and the operation of armature 20 responsive thereto, such wear is in such a direction that the air gap between the armature 20 and iron core 10 is not changed whereby the magnetic characteristics of the relay are maintained.

Having fully described the invention, what is considered new and is desired to have protected by Letters Patent is specifically pointed out in the following claims.

What is claimed is:

1. In a relay including a magnet and a heel-piece secured thereto, a unitary structure comprising an armature, a pivot pin and a relay yoke permanently assembled with said pin securely and fixedly fastened to said armature and with said pin rotatably secured in said yoke, a spring having holes therein, holes in said relay yoke and threaded holes in said heel-piece, and screws extending through the holes in said spring and the holes in the relay yoke into the threaded holes in said heel-piece to rigidly fasten the yoke of said unitary structure to said heel-piece, said screws also tensioning said spring against said pin to prevent movement of said armature except when said magnet is being energized and deenergized.

2. In a relay including a magnet and a heel-piece secured thereto, a unitary structure comprising an armature, a pivot pin and a relay yoke permanently assembled with said pin securely and fixedly fastened to said armature and with said pin rotatably secured in said yoke, a spring, and assembly means for rigidly fastening the yoke of said unitary structure to said heel-piece, said assembly means also tensioning said spring against said pin to prevent movement of said armature except when said magnet is being energized and deenergized.

3. In a relay including a magnet and a heel-piece secured thereto; a unitary assembly comprising a plurality of circuit controlling contact springs separated by insulators, a damper spring, a back-stop, an armature having a contact operating arm placed between said damper spring and said back-stop for controlling said contact springs, a relay yoke, and a pivot pin securely and fixedly fastened to said armature and rotatably secured in said yoke; a spring, and assembly means for rigidly fastening the yoke of said unitary assembly to said heel-piece, said assembly means also mounting and tensioning said spring against said pin to prevent movement of said armature except when said magnet is being energized and deenergized.

4. In a relay including a magnet and a heel-piece secured thereto; a unitary assembly comprising a relay yoke, a plurality of circuit controlling contacts mounted on said relay yoke, an armature for controlling said contact springs, and a pivot pin securely and permanently fastened to said armature and rotatably secured in said relay yoke; a spring, and assembly means for rigidly fastening the yoke of said unitary assembly to said heel-piece, said assembly means also tensioning said spring against said pin to prevent movement of said armature except when said magnet is being energized and deenergized.

RALPH R. FOWLER.